UNITED STATES PATENT OFFICE.

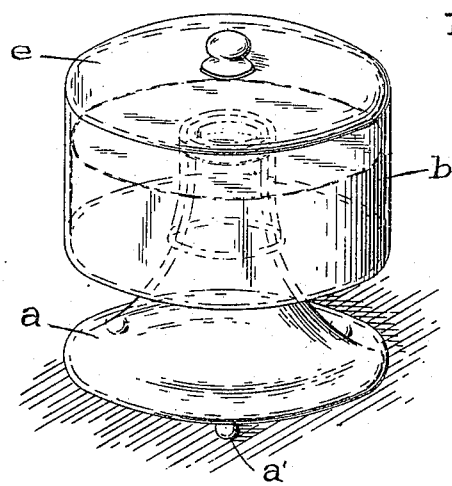
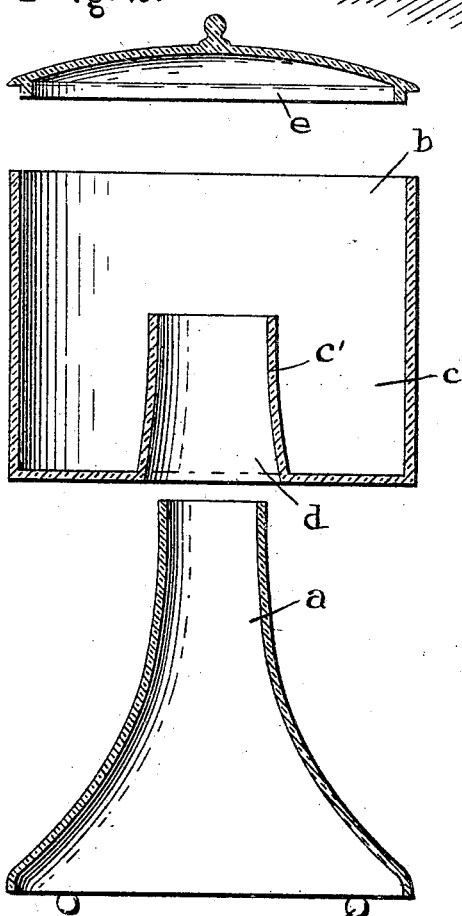
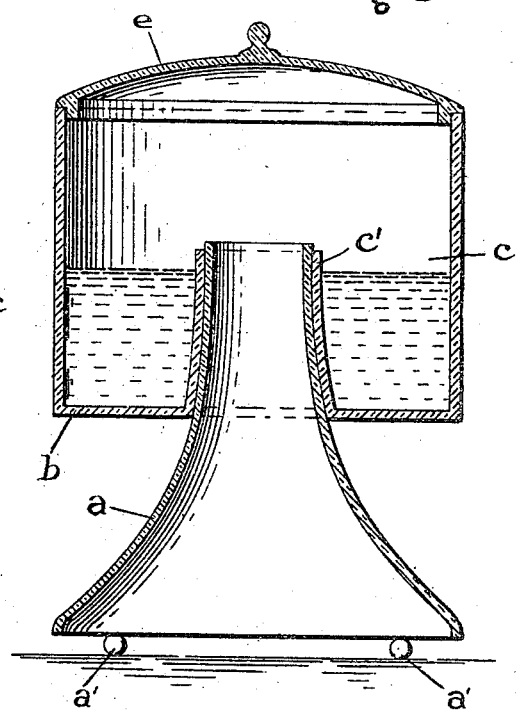

JOEL W. MALPHURS, OF GAINESVILLE, FLORIDA.

INSECT-TRAP.

951,763. Specification of Letters Patent. Patented Mar. 8, 1910.

Application filed June 28, 1909. Serial No. 504,910.

*To all whom it may concern:*

Be it known that I, JOEL W. MALPHURS, a citizen of the United States, resident of Gainesville, in the county of Alachua and State of Florida, have made a certain new and useful Invention in Insect-Traps; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a perspective view of the invention. Fig. 2 is a central vertical section of the invention with the parts thereof separated. Fig. 3 is a similar view with parts assembled.

The invention has relation to insect traps, and it consists in the novel construction and combinations of parts as hereinafter set forth.

In the accompanying drawings, illustrating the invention, the letter $a$, designates a hollow tapering pedestal section having the form of an inverted funnel, and raised from the table or floor, upon which it rests by short marginal knobs or legs $a'$, three being shown.

$b$, is the cylindrical body section, having an annular basin or receptacle $c$, of a depth which is but a portion of the depth of the body (about one-half as shown), said basin being designed to contain water. The upper portion $c'$, of the cylindrical body is entirely vacant. The body $b$, has a central opening $d$, bounded by the annular tapering inner wall $c'$ of the basin $c$, and into which extends and closely fits in a removable manner the upper tapering part $a'$ of the pedestal $a$. The engagement of the tapering upper part of the pedestal with the tapering inner wall of the body section is of such an extended nature as to form a strong supporting connection for these parts.

A removable cover $e$, is provided for the body section of the trap, being of the same diameter as that of the body section. The three parts of the trap are preferably formed of transparent material, such as glass, to render the interior visible at all times.

The insects will crawl into the base of the support to reach the bait, which is placed therein, afterward crawling up the sides of the pedestal or base and after flying around in the closed chamber $c'$, will fall into the water of the basin $c$, wherein they will be drowned.

The trap being made in three separable parts of simple character, may be economically manufactured and also easily cleaned. Should one part break it may be readily replaced at small cost.

Having thus described the invention, what I claim as new and desire to secure by Letters Patent is:

1. An insect trap composed of three separate sections, namely a hollow tapering pedestal section having an entrance opening at the bottom, a cylindrical body section having an annular lower water chamber provided with a central opening, an annular inner wall having extension to the bottom of said body section and detachable supporting engagement with the upper portion of said pedestal and an upper vacant space above the water chamber, and a removable circular cover of the same diameter as that of said body section.

2. An insect trap composed of three separate sections, namely a hollow tapering pedestal section having an entrance opening at the bottom, a body section having a lower water chamber provided with a central opening, a tapering inner wall having an extended detachable supporting engagement with the upper tapering portion of the pedestal, and an upper vacant space above the water chamber, and a removable cover.

In testimony whereof I affix my signature, in presence of two witnesses.

JOEL W. MALPHURS.

Witnesses:
B. R. COLSON,
L. HALE.